March 1, 1960   F. B. HALFORD ET AL   2,926,489
ADJUSTABLE PROPULSION NOZZLES
Filed May 13, 1955   3 Sheets-Sheet 1
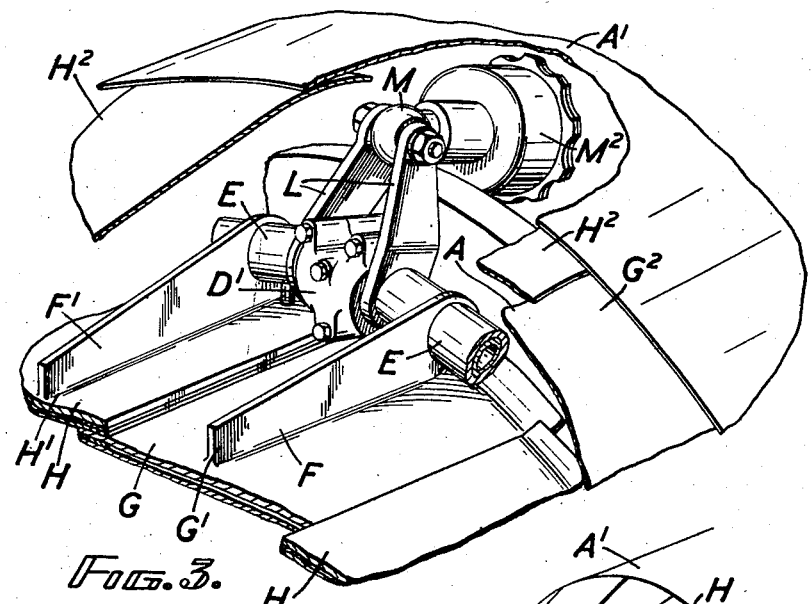
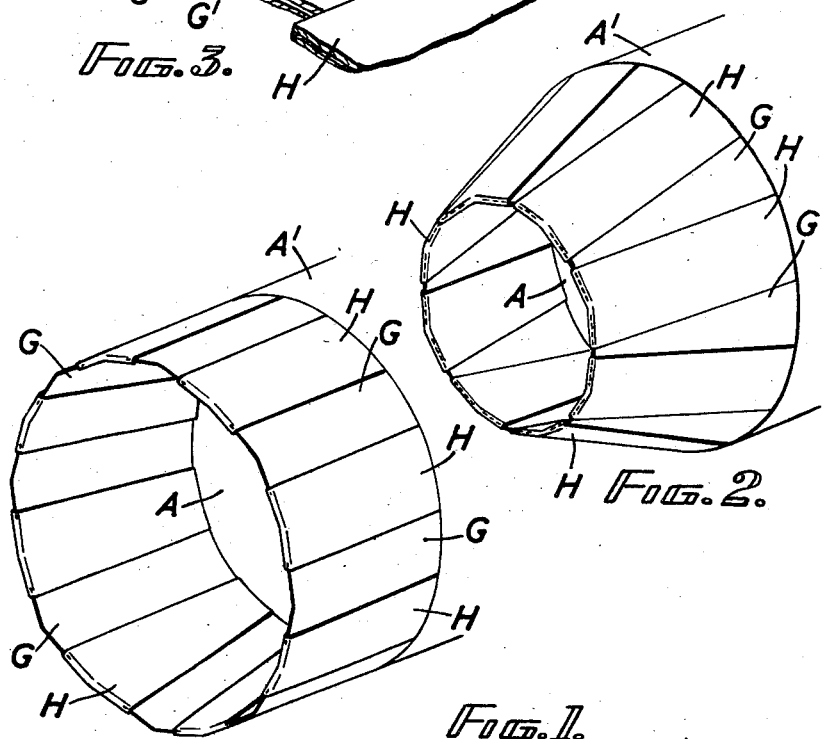
INVENTORS
FRANK B. HALFORD
FRANK M. OWNER
GEORGE F. CLARKE
BY *Holcombe Wetherill*
*& Brisebois*
ATTORNEYS

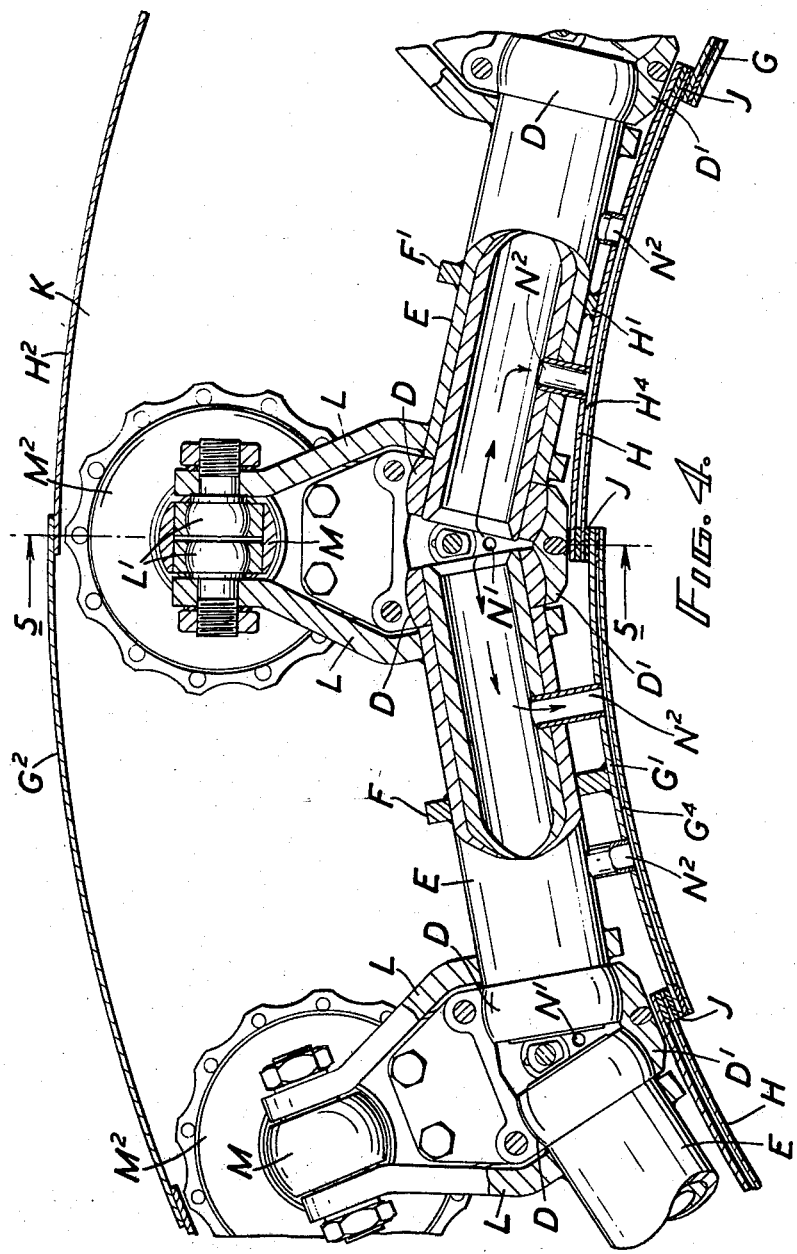

March 1, 1960  F. B. HALFORD ET AL  2,926,489
ADJUSTABLE PROPULSION NOZZLES
Filed May 13, 1955  3 Sheets-Sheet 3

INVENTORS
FRANK B. HALFORD
FRANK M. OWNER
GEORGE F. CLARKE
BY Holcombe Wetherill
and Brisebois
ATTORNEYS.

United States Patent Office 2,926,489
Patented Mar. 1, 1960

2,926,489
ADJUSTABLE PROPULSION NOZZLES

Frank Bernard Halford, deceased, late of Northwood, by Alfred Hardy Bentley, George Purvis Bulman, and John Hardy Bentley, executors, London, and Frank Morgan Owner, London, and George Frederick Clarke, Stanmore, England, assignors to The De Havilland Engine Company Limited, Leavesden, England, a British company Application May 13, 1955, Serial No. 508,254

Claims priority, application Great Britain May 18, 1954

4 Claims. (Cl. 60—35.6)

This invention relates to adjustable propulsion nozzles, more especially for use in jet propulsion apparatus for aircraft, the term aircraft being used herein to include both piloted and unpiloted aircraft and missiles propelled partially or wholly by one or more propulsion jets.

It is an object of the invention to provide an adjustable propulsion nozzle which in its various positions of adjustment will be of satisfactory aero-dynamic form and which, if desired, will enable a nozzle to be provided which can at will be varied from the convergent form suitable for subsonic conditions of gas flow therethrough to the convergent-divergent form suited to supersonic conditions of gas flow therethrough.

An adjustable propulsion nozzle assembly according to the present invention comprises a fixed non-adjustable tubular nozzle portion, which may be of convergent form, to the rear edge of which are hinged, about axes tangential to a circle or circles having the axis of the fixed portion for centre, the forward ends of a series of flap-like members extending rearwardly from their hinged ends and with their adjacent edges arranged to overlap and slide over one another in a circumferential sense so that the flap-like members together form a tubular nozzle part the form of which can be varied by movement of the flap-like members simultaneously about their hinge axes, and means for effecting such simultaneous movement.

Generally the fixed portion of the nozzle will be of circular cross section so that the axes of the hinges of the flap-like members will be tangential to a single circle having the axis of such fixed portion for centre, the arrangement being such that the fixed portion of the nozzle and the adjustable portion formed by the flap-like members have a common axis.

Moreover each flap-like member conveniently has a cross section in planes normal to the axis of the nozzle which merges from arcuate form at its hinged end to a wide angle V-shaped cross section at its rear end so that the part of the nozzle formed by the flap-like members merges from approximately circular cross section at its forward to polygonal cross section at its rear end.

It will be understood that when an adjustable nozzle according to the invention is to provide at will for a convergent nozzle or a convergent-divergent nozzle, the fixed non-adjustable portion of the nozzle will be of convergent form while the dimensions of the flap-like members and the movement which can be imparted to them will be such that the form of the portion of the nozzle formed thereby can be varied from the convergent to the divergent form.

In a convenient arrangement the flap-like members comprise equal numbers of inner and outer members with the edge portions of each inner member arranged to lie within and slide over the adjacent edge portions of each of the adjacent outer members.

The mechanism for moving the flap-like members and the manner in which they are supported may vary. In one convenient arrangement, however, each flap-like member is rigidly attached, as by a flange or web, to a hinge bar carried in bearings in a supporting ring, and the adjacent ends of each adjacent pair of hinge bars carry levers the outer ends of which are connected by self-aligning joints to a common operating member, for example in the form of a connecting rod connected at one end to the levers referred to and at its other to the piston of a hydraulic or pneumatic servo device the cylinder of which is carried by the supporting ring.

Pneumatic apparatus for operating the flap-like members will generally be preferred to hydraulic apparatus in view of the high temperatures to which the apparatus may be subjected.

A sealing strip is preferably provided on one of each pair of overlapping edge portions of the flap-like members, this strip being formed for example of graphitic carbon or the like to facilitate the sliding of the edge portions over one another.

The details of construction may vary considerably but one construction of adjustable propulsion nozzle according to the invention is shown by way of example in the accompanying drawings, in which Figures 1 and 2 are diagrammatic perspective views of the nozzle respectively in its maximum-exit-diameter and minimum-exit-diameter positions.

Figure 3 is a perspective view on an enlarged scale partly in section and partly cut away, showing the construction and arrangement for mounting and moving one pair of the adjacent flap-like members of which the adjustable section of the nozzle is formed.

Figure 4 is a rear view, partly in section for the sake of showing the required constructional features, and on a still further enlarged scale, of the arrangement for mounting and moving three of the adjacent flap-like members of which the adjustable section of the nozzle is formed.

Figure 5:
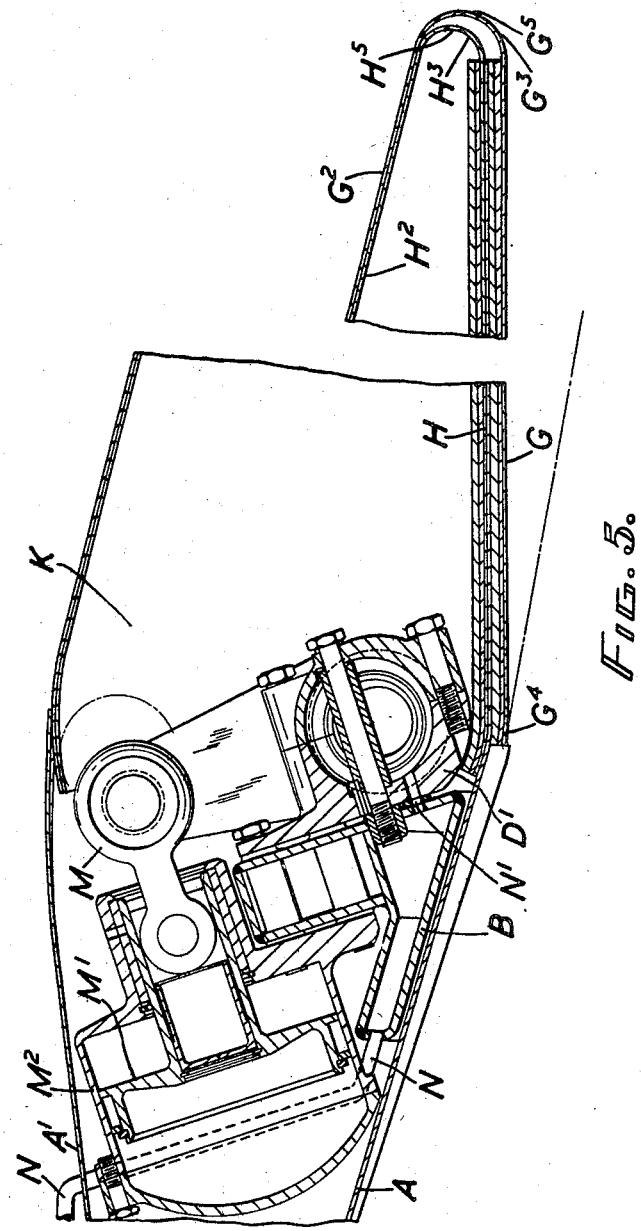
Figure 5 is a sectional side elevation in the plane 5—5 of Figure 4.

In the construction shown the nozzle consists of a fixed tubular convergent portion A enclosed within and spaced from an outer surrounding wall $A^1$. At the rear end of the fixed tubular convergent portion A is a rigid load-carrying supporting ring B which may serve to support the rear end portion of the nozzle.

Supported at their inner ends in self-aligning bearings D in housings $D^1$ rigid with the supporting ring B are a series of, say 16, hinge pins E with their axes tangential to a circle having the axis of the nozzle for centre as shown most clearly in Figures 3 and 4.

Each hinge pin has rigidly mounted on or formed integral with it and disposed at approximately the centre of its length a web or flange F or $F^1$ lying in a plane containing the axis of the nozzle and extending rearwardly from its hinge pin and each of these webs supports a flap-like member G or H attached to its inner edge as by welding as indicated at $G^1$, $H^1$. As shown the flap-like members G and H are arranged in pairs each comprising an inner member G and an outer member H with the edges of the inner members G lying and being arranged to slide within the edge portions of the outer members H. Each of the flap-like members G and H has a cross section in planes normal to the axis of the nozzle assembly which is arcuate at the end near its hinge pin E and changes gradually throughout its length until at its rear end it is of wide angle V cross section. Moreover a sealing strip, formed for example of graphitic carbon, or the like may be provided on one or other of each pair of over-lapping edges of the flat members G and H as indicated at J. The flap-like members thus together form the adjustable section of the nozzle.

As will be seen in Figures 4 and 5, each of the flap-like members constituting the adjustable section of the nozzle proper is formed hollow as indicated at $G^4$, $H^4$ and is integral with an outer wall $G^2$ or $H^2$ connected to its rear edge by a curved portion G³, H³ and extending up to and making sliding engagement with the rear edge of the outer wall A¹ so as to form in effect an approximately smooth or streamlined continuation of this outer wall A¹. The complete flap-like members G and H with their outer walls G², H² thus enclose an annular space K.

Rigidly mounted on each hinge pin E at points adjacent to the bearings supporting its ends are operating levers L extending in an outward direction and the outer ends of each adjacent pair of levers L are connected by ball and socket connections L¹ to one end of a connecting rod M the other end of which is connected to a double-acting piston M¹ in a pneumatic cylinder M² carried by the supporting ring B. All the cylinders M² are associated with means for supplying pneumatic pressure to one end or the other thereof in a manner well-known per se, and it will be seen that the movement thus imparted simultaneously to the pistons M¹ in such cylinders will, by simultaneously rocking the levers L and hence the hinge pins E, cause simultaneous pivotal movement of all the flat-like members G and H from one to the other of the positions shown in Figures 1 and 2. It will also be apparent that the operating mechanism for the flap-like members is all housed within the space K and the continuation thereof formed respectively by the inner and outer walls A and A¹.

Air cooling may be provided for the flap-like members G and the mechanism within them, for example by means of air tapped from the compressor of a combustion turbine unit delivering working fluid to the nozzle assembly. Thus, as shown in Figures 4 and 5, the ring B may be hollow and have cooling air supplied to it by one or more pipes N, passages N¹ being formed in the housings D¹ by which such air flows into the bores of the hollow hinge pins E from their ends, and thence out of the hinge pins E through tubular passages N² into the hollow interiors G⁴ or H⁴ of the flap-like members G and H and finally out of these flap-like members through openings G⁵, H⁵ at their rear edges. In addition a tapping may be taken from the pipe N into the space K for cooling the operating mechanism for the flap-like members G and H.

The flap-like members G and H are dimensioned so that when they are moved inwards to the maximum degree towards the axis of the nozzle as shown in Figure 2, the adjustable section of the nozzle formed by them will be convergent so that the fixed and adjustable sections of the nozzle provide a convergent nozzle whereas when they are moved outwards to the maximum degree as shown in Figure 1 they provide a divergent section of the nozzle which, with the fixed portion A therefore provides a convergent-divergent nozzle.

In the construction shown the centre of the radius of curvature of the surface G⁴ of each flap-like member is at the axis of the associated hinge pin E so that substantially no change takes place in the cross sectional area of the nozzle in the transverse plane containing the axes of the hinge pins E with movement of the flap-like members G. In a modification, however, the centre of the radius of curvature of the surface G⁴ may be displaced from the axis of the associated hinge pin E so that the cross sectional area referred to changes in some desired manner with movement of the flap-like members G.

The adjustable section of the nozzle according to the invention may be arranged to have only two or more normal predetermined operating positions or to be adjustable as desired within the range represented by Figures 1 and 2.

What we claim as our invention and desire to secure by Letters Patent is:

1. An adjustable propulsion nozzle assembly comprising a fixed non-adjustable tubular nozzle portion, a series of flap-like members each hinged at its forward edge to the rear edge of the said fixed nozzle portion about an axis which is tangential to a circle having the axis of said fixed nozzle portion for centre, the adjacent edge of said flap-like members overlapping and sliding over one another in a circumferential sense and said flap-like members together forming an adjustable tubular nozzle portion the form of which is variable by simultaneous movement of the said flap-like members about their hinge axes, and operating means arranged to effect such simultaneous movement, said operating means comprising a hinge pin rigidly connected to each flap-like member, a supporting ring disposed at the rear end of the fixed tubular nozzle portion, bearings carried by the said supporting ring and supporting the said hinge pins, an operating lever on each hinge pin disposed on that end of the hinge pin which lies adjacent to the operating lever on the adjacent end of an adjacent hinge pin, an operating member adjacent to each pair of adjacent operating levers and self-aligning joints connecting each operating member to its adjacent pair of operating levers.

2. An adjustable propulsion nozzle assembly as claimed in claim 1 in which the operating member comprises a connecting rod connected to a fluid operated piston in a cylinder carried by the supporting ring.

3. An adjustable propulsion nozzle assembly comprising a fixed non-adjustable tubular nozzle portion, a series of flap-like members comprising inner and outer walls connected at their rear ends, an outer casing surrounding said fixed tubular nozzle portion, the front ends of the outer walls of the flap-like members extending into engagement with the rear end of said casing to form an annular chamber bounded on its outer side by the outer walls of the flap-like members and said outer casing and on its inner side by the inner walls of said flap-like members and said fixed tubular nozzle, each flap-like member being hinged at its forward edge to the rear edge of the said fixed nozzle portion about an axis which is tangential to a circle having the axis of the said fixed nozzle portion for a center, and having at its rear end a wide angle V-shaped cross-sectional form in planes normal to the axis of the nozzle portion, the adjacent edge portions of said rear ends of said flap-like members having flat surfaces which are parallel to one another and overlap and slide over one another in a circumferential sense, said flap-like members together forming an adjustable tubular nozzle portion having a gas exit opening of polygonal cross-section, the cross-sectional area of which is variable by simultaneous movement of said flap-like members about their hinge axes, and operating means lying in said chamber arranged to effect such simultaneous movement, said operating means comprising a hinge pin in said chamber rigidly connected to each flap-like member, a supporting ring disposed at the rear end of the fixed tubular nozzle portion within the said chamber, bearings in said chamber carried by said supporting ring and supporting said hinge pins, an operating lever in said chamber on each hinge pin and disposed on that end of the hinge pin which lies adjacent to the operating lever on the adjacent end of an adjacent hinge pin, an operating member within said chamber adjacent to each pair of adjacent operating levers, and self-aligning joints connecting each operating member to its adjacent pair of operating levers.

4. An adjustable propulsion nozzle assembly as claimed in claim 3 in which the operating member comprises a connecting rod connected to a fluid operated piston in a cylinder carried by the supporting ring and disposed within said chamber.

References Cited in the file of this patent

UNITED STATES PATENTS

| | | |
|---|---|---|
| 2,637,164 | Robson et al. | May 5, 1953 |
| 2,651,172 | Kennedy | Sept. 8, 1953 |
| 2,697,907 | Gaubatz | Dec. 28, 1954 |
| 2,726,509 | Gist et al. | Dec. 13, 1955 |
| 2,770,944 | Jordan | Nov. 20, 1956 |
| 2,806,349 | Yeager | Sept. 17, 1957 |

FOREIGN PATENTS

| | | |
|---|---|---|
| 998,358 | France | Sept. 19, 1951 |